No. 695,164. Patented Mar. 11, 1902.
A. N. MILLER.
BICYCLE.
(Application filed Aug. 5, 1901.)
(No Model.)
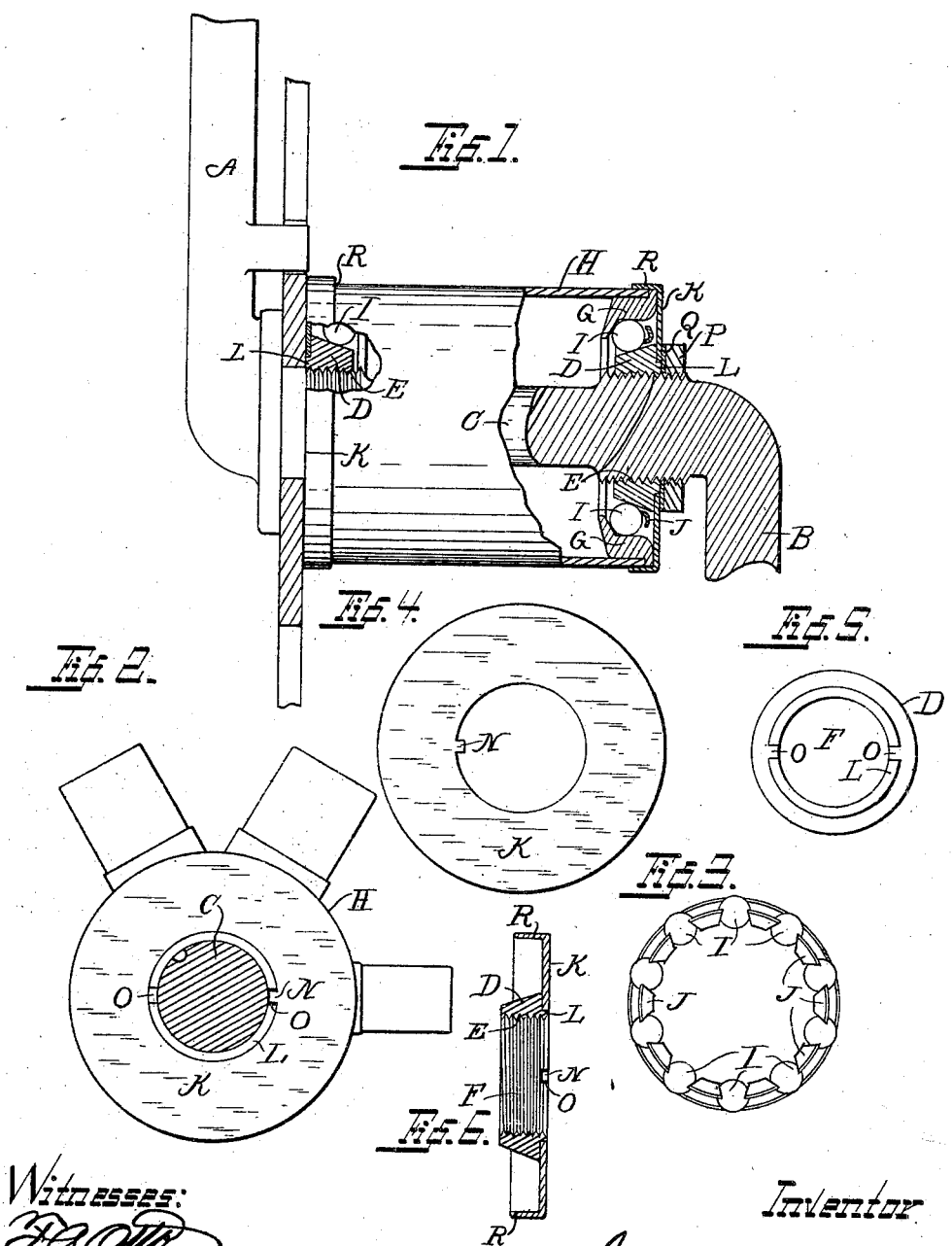

UNITED STATES PATENT OFFICE.

ADOLPH N. MILLER, OF NORTH MILWAUKEE, WISCONSIN.

BICYCLE.

SPECIFICATION forming part of Letters Patent No. 695,164, dated March 11, 1902.

Application filed August 5, 1901. Serial No. 70,878. (No model.)

*To all whom it may concern:*

Be it known that I, ADOLPH N. MILLER, a citizen of the United States, residing at North Milwaukee, county of Milwaukee, and State of Wisconsin, have invented new and useful Improvements in Bicycles, of which the following is a specification.

My invention relates to improvements in that class of bicycles in which the two pedal-cranks and the crank-axle are formed of a single piece; and it pertains more especially, first, to the construction and arrangement of the stationary exterior annular ball-bearing collars and the means of holding them in place in the hub, and, second, to the construction and arrangement of the revoluble interior ball-bearing collars and the separable annular capping-plates, which are detachably interlocked therewith and serve to close the ends of the hub.

The construction of my invention is explained by reference to the accompanying drawings, in which—

Figure 1 represents a side view of a bicycle-hub, part broken away to show my improvements. Fig. 2 is an end view of the bicycle-hub, the axle of the crank being shown in cross-section. Fig. 3 represents one of the two series of ball-bearings and their retaining-frame removed from the hub. Fig. 4 represents a front view of an annular disk for closing the ends of the hub around the axle of the crank-hanger removed from the hub. Fig. 5 represents a front view of one of the interior ball-bearing collars, one of which is used at each end of the crank-axle. Fig. 6 represents a sectional view of the annular capping-plate for closing the end of the hub and the interior ball-bearing collar, with which it is interlocked, removed from the crank.

Like parts are identified by the same reference-letters throughout the several views.

Referring to Fig. 1, the pedal-cranks A and B and crank-axle C are formed in a single piece. To the respective ends of the crank-axle C (which axle comprises the horizontal shaft between the two cranks) are secured the ball-bearing collars D D by screw-threaded joints E, the diameters of the openings F being such as to permit said bearings to pass freely over the ends of the cranks when putting them in place. The exterior ball-bearing collars G are held in place within the walls of the hub H by a closely-fitting unthreaded joint, said parts being forced together with sufficient pressure to insure a permanent joint between them.

I represents a series of balls which are located between the opposing ball-bearing collars D and G, as shown in Fig. 1, the series of balls I being secured in place at uniform distances apart by the ball-retaining collar J, which is of ordinary construction. The ball-bearing collars G having been forced in the respective ends of the hub H, as shown in Fig. 1, the series of balls I are placed within said bearing, when the interior bearing-collars D are passed over the shank B and screwed on the thread E of the crank-axle, as indicated in said figure, whereby the series of balls I are retained in place between said bearings. When this is done, the annular capping-plate K is also passed over the crank and secured in place upon the annular flange L of the interior ball-bearing D, as indicated in Fig. 6. The annular capping-plate K is provided with an inwardly-projecting lug N, which is adapted to engage in a corresponding recess O, provided therefor in the annular flange L, whereby said capping-plate K is interlocked and caused to revolve with said interior ball-bearing collars D as the crank and axle are rotated in the act of driving the bicycle. When the annular capping-plate K is thus interlocked with the interior ball-bearing D, it is held in place by the clamping-nut P, which is screwed upon the same thread E with said interior ball-bearing collar firmly against the annular washer Q, which washer is interposed between the clamping-nut P and the capping-plate K, while the inner edge of said washer also bears simultaneously against the opposing edge of the flange L, whereby said annular capping-plate K is securely held in place upon said interior ball-bearing D.

Heretofore it has been common to construct the interior ball-bearing collar integral with the annular capping-plate. By my improvement, however, such parts are made separable from two different kinds of metal, whereby a very important object is attained. It is a well-known fact that it is desirous to form the ball-bearings of a bicycle of chilled steel or from hard metal that will be subject to the least possible wear, while it is also desirous in that class of work to form the parts as thin and light as the required strength will permit, and it will therefore be understood that when the ball-bearing D and capping-plate K are formed integral of a single piece of highly-tempered steel the capping-plate K will be brittle and liable to break if made of the desired thinness. By my improvement I am enabled to form the capping-plate K of thin sheet metal which is tough and flexible, while the ball-bearing D can be made of highly-tempered steel, whereby both of said parts are much more durable than it would be possible to make them if they were constructed in a single piece from the same quality of metal. I am also enabled by this construction to make the capping-plate K much thinner than it would be practicable to make it if constructed of a more brittle material. A no less important object is also attained by the present form of construction in that the capping-plates K can be struck up from sheet metal at about one-twentieth the cost that they can be if made of cast metal, as a large amount of lathework is thereby avoided. The capping-plates K are provided with right-angular flanges R, which are adapted to overlap and surround the respective ends of the hub H, as shown in Fig. 1.

It will of course be understood that in that class of bicycles in which the pedal-cranks are formed of two separate pieces the hub may be made but slightly larger than the crank-axle, in which case the necessity of using an annular capping-plate for closing the end of the hub is avoided; but owing to the fact that by the present form of construction, in which the pedal cranks and axle are formed integral, it becomes necessary to greatly increase the diameter of the hub, so that the single-piece pedal-crank may be inserted through it, it becomes necessary to either increase the diameter of the interior ball-bearing collar, so as to close the ends of the hub, or to provide a separate capping-plate for closing such ends, as herein described.

With the above-described construction it is not necessary to remove the exterior ball-bearing cones or collars to insert or remove the one-piece crank, as the size of the apertures in the cones allows the manipulation of the crank therethrough. By providing the capping-plate and inner cone or collar with the interlocking projections and recesses the cap-plate may be used as a wrench to adjust the cone and may be entirely removed as soon as the cone is adjusted, thus permitting access to the balls without removing the cone.

Having thus described my invention, what I claim as new, and desire to secure by Letters Patent, is—

In a bicycle, the combination of pedal cranks and axle in a single piece, and provided with screw-threads for the interior bearing-cones, a crank-hanger having exterior ball-bearing collars permanently secured therein and adapted to permit the manipulation of the crank therethrough; interior threaded bearing cones or collars adapted to engage the screw-threaded portion of the crank-shaft; an annular capping-plate engaged with and covering the ends of the crank-hanger sleeve; said plate and interior bearing-collar having interlocking projections and recesses; and means for securing the annular plate in position.

In testimony whereof I affix my signature in the presence of two witnesses.

ADOLPH N. MILLER.

Witnesses:
JAS. B. ERWIN,
C. L. ROESCH.